US007637103B2

(12) United States Patent
Karl et al.

(10) Patent No.: US 7,637,103 B2
(45) Date of Patent: Dec. 29, 2009

(54) HYDRAULIC CONTROL ARRANGEMENT

(75) Inventors: Erhard Karl, Neuhütten (DE); Edwin Harnischfeger, Jossgrund (DE)

(73) Assignee: Bosch Rexroth AG, Stuttgart (DE)

( * ) Notice: Subject to any disclaimer, the term of this patent is extended or adjusted under 35 U.S.C. 154(b) by 326 days.

(21) Appl. No.: 11/630,695

(22) PCT Filed: Jul. 6, 2005

(86) PCT No.: PCT/EP2005/007309

§ 371 (c)(1),
(2), (4) Date: Apr. 26, 2007

(87) PCT Pub. No.: WO2006/005497

PCT Pub. Date: Jan. 19, 2006

(65) Prior Publication Data

US 2008/0104866 A1 May 8, 2008

(30) Foreign Application Priority Data

Jul. 13, 2004 (DE) ...................... 10 2004 033 890

(51) Int. Cl.
*F16D 31/02* (2006.01)

(52) U.S. Cl. ........................................................ 60/469

(58) Field of Classification Search .................. 60/413, 60/469
See application file for complete search history.

(56) References Cited

U.S. PATENT DOCUMENTS

| | | | |
|---|---|---|---|
| 5,733,095 | A | 3/1998 | Palmer et al. |
| 6,351,944 | B1 | 3/2002 | Fertig et al. |
| 6,357,230 | B1 | 3/2002 | A'Hearn et al. |

FOREIGN PATENT DOCUMENTS

| | | | |
|---|---|---|---|
| DE | 28 21 505 | A1 | 11/1979 |
| DE | 39 09 205 | C1 | 5/1990 |
| DE | 197 43 005 | A1 | 6/1998 |
| DE | 197 54 828 | A1 | 6/1999 |
| DE | 100 60 430 | A1 | 6/2001 |
| EP | 1 264 989 | A | 12/2002 |

*Primary Examiner*—Michael Leslie
(74) *Attorney, Agent, or Firm*—Oliff & Berridge, PLC

(57) ABSTRACT

Disclosed is a hydraulic control arrangement for damping wagging vibrations, wherein during operation a hydraulic cylinder of a lifting equipment can be connected to a hydraulic accumulator via a damping valve arrangement. The damping valve arrangement comprises a nozzle valve arrangement with two different nozzle cross-sections, the larger of which is active when filling the hydraulic accumulator and the smaller of which is active during adaptation of the hydraulic accumulator to the load pressure of the hydraulic cylinder.

14 Claims, 4 Drawing Sheets

HYDRAULIC CONTROL ARRANGEMENT

Figure 1:
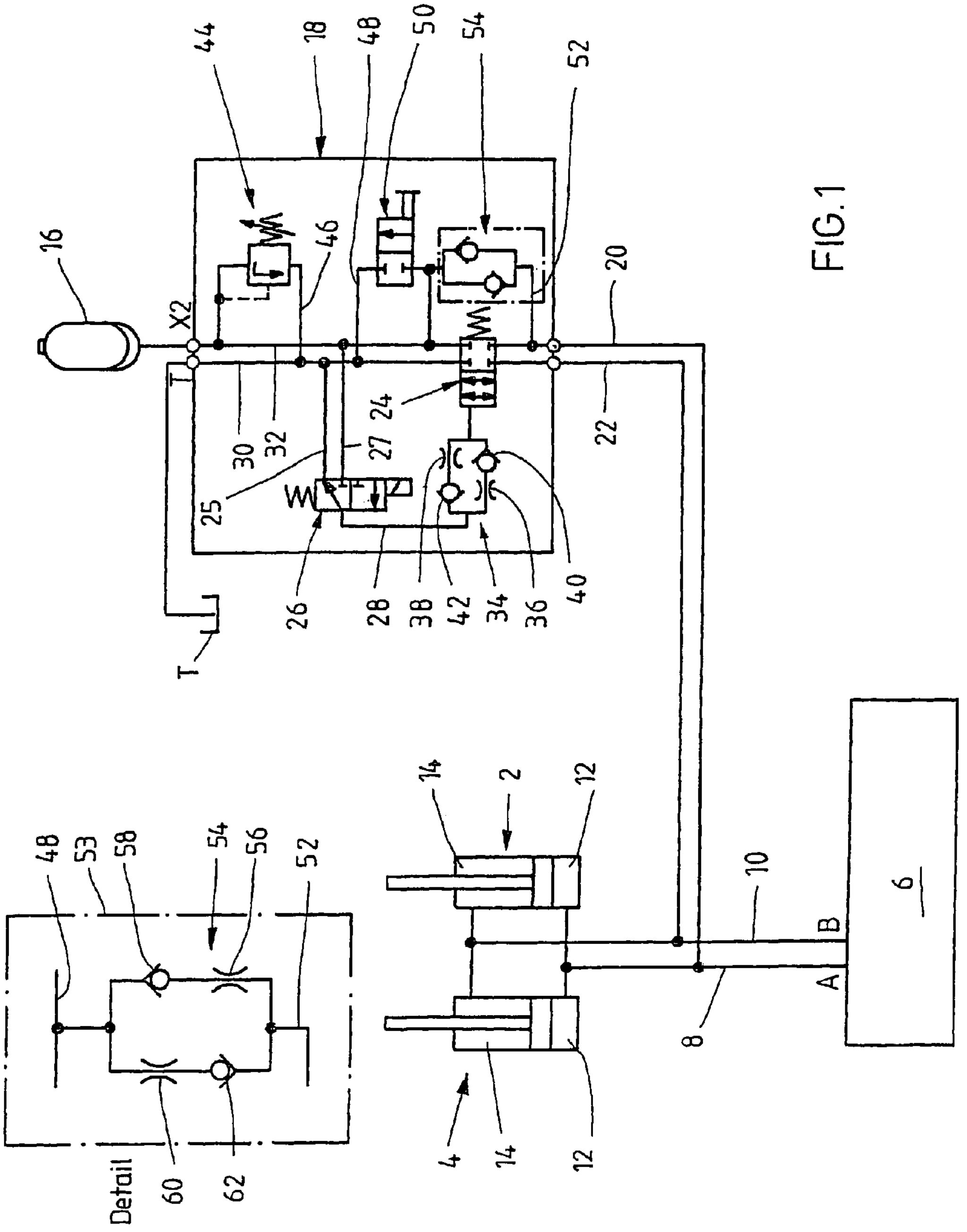

The invention relates to a hydraulic control arrangement for damping wagging vibrations of a mobile work machine in accordance with the preamble of claim 1.

Mobile work machines such as fork lifts, telehoist load luggers, and wheel loaders usually do not comprise a spring damper system between the undercarriage and the chassis, as it is the case with passenger cars and trucks. In the case of mobile work machines, damping of the undercarriage is substantially performed by the tires and is therefore relatively restricted. The use of spring damper systems in the case of mobile work machines may entail undesired, negative properties in particular situations of operation, e.g. a poor positioning accuracy during the gathering and depositing of the loads by springing in or out, or reduced tear-out forces on wheel loader buckets during operation in a debris, which are caused by the energy consumption in the spring damper system.

A disadvantage of undamped work machines are the distinctly worse driving characteristics. In particular work machines with transport loads externally of the wheel base tend, during quicker driving, depending on the road condition and on the load, to partially substantial wagging vibrations. The work machine then exhibits a substantially deteriorated steering and braking behavior. In addition, the vehicle and the driver are strongly burdened by the vibrations occurring, and the position stability of the transport load is endangered, which may result in a loss of the transport good in the case of unfavorable conditions. The accelerations acting on the driver may result in considerable damage to health. The increased stress on the vehicle by the vibrating movements causes increased wear and results in increased maintenance efforts.

These disadvantages may indeed be diminished if the driving speed is reduced, but this has the disadvantage that the handling performance of the work machine will decrease correspondingly.

For reducing the wagging vibrations and for eliminating the above-described disadvantages, a stabilizing system with a hydropneumatic accumulator as a spring damper element is incorporated in the hydraulic lifting systems of the work machine between the control block and the lifting cylinder bottom. Such a solution is, for instance, known from DE 197 43 005 A1. In this stabilizing system, a bottom side of a hydraulic cylinder of a lifting equipment of a work machine is, from a predetermined driving speed on, connected with a hydraulic accumulator via a pilot-controlled directional control valve. During the working cycle of the hydraulic cylinder, the hydraulic accumulator is charged via a further pilot valve. The latter also enables to adapt the accumulator pressure to the load pressure that is active at the hydraulic cylinder.

A disadvantage of this solution is that the switching mechanism with the pilot-controlled directional control valve and the pilot valve is very complex.

DE 39 09 205 C1 describes a system for wagging vibration damping in which, during the operation of the work machine, the bottom side of the hydraulic cylinder of the lifting equipment is, via an electrically actuated directional control valve, connected with a hydraulic accumulator, and the ring side with a tank. The filling of the hydraulic accumulator during the working cycle is performed via a filling valve with a downstream check valve. An adaptation of the accumulator pressure to the load pressure of the hydraulic cylinder is not provided for with this known solution.

DE 197 54 828 A1 of the applicant discloses a hydraulic control arrangement for damping wagging vibrations in which, during operation, the bottom side of the hydraulic cylinder can, via a logic valve arrangement, be connected with the hydraulic accumulator, and the ring side with the tank. This logic valve arrangement also enables the filling of the hydraulic accumulator during the working cycle. In this known solution, the adaptation of the accumulator pressure to the load pressure is performed via a throttle with a downstream check valve. This solution is also very complex and correspondingly expensive.

In contrast to this it is an object of the invention to provide a hydraulic control arrangement by which wagging vibrations of a mobile work machine can be reduced with minimum effort.

This object is solved by a hydraulic control arrangement with the features of claim 1.

The inventive hydraulic control arrangement comprises a damping valve arrangement via which a first pressure chamber of a hydraulic cylinder which is active in support direction is adapted to be connected with a hydraulic accumulator for wagging vibration damping, and a pressure chamber of the hydraulic cylinder which is active in lowering direction is adapted to be connected with a tank or low pressure. Via the damping valve arrangement, the hydraulic accumulator is adapted to be connected, during a working cycle of the hydraulic accumulator, with a pump line for filling and with the tank or the low pressure for adapting the accumulator pressure to the load pressure. In accordance with the invention, the hydraulic control arrangement comprises a nozzle valve arrangement with two different nozzle cross-sections, the larger of which is active during filling and the smaller of which is active during adaptation of the accumulator pressure to the load pressure. Due to the comparatively large nozzle that is active during the filling of the hydraulic accumulator, the quick charging of the hydraulic accumulator is guaranteed, so that, on switching on of the damping, the accumulator pressure is high enough that the lifting equipment is supported and cannot sag. During the adaptation of the accumulator pressure to the current load pressure, the smaller nozzle is active, so that the balancing processes take place relatively slowly and the hydraulic accumulator is correspondingly prevented from damage.

The damping valve arrangement is preferably configured with a pilot-controlled directional control valve that locks, in a basic position, a connection between the first pressure chamber and the hydraulic accumulator and between the second pressure chamber and the tank/low pressure, and that opens these connections in a switching position.

The pilot control may be performed via an electrically actuated pilot valve that impacts a control face of the directional control valve which is active in opening direction with tank pressure in a switching position and in a second switching position with the accumulator pressure.

In an embodiment of particularly simple construction, the nozzle valve arrangement is connected with a bypass line via which directional control valve can be bypassed.

In one embodiment, the nozzle valve arrangement is designed as a shuttle valve, wherein a check valve that allows a pressure medium flow to the hydraulic accumulator during filling or a pressure medium flow in counter direction during adaptation, respectively, is assigned to each nozzle cross-section.

Preferably, the shuttle valve is designed with a shuttle bolt that is guided to be moved in a valve bore between two valve seats. The shuttle bolt comprises a valve cone each at the front side, at the outer circumference of which at least one nozzle chamfer is formed. The active nozzle chamfer cross-section at one valve cone is larger than that at the other valve cone, so that the larger nozzle chamfer cross-section is flown through during the filling of pressure medium while the pressure medium flow during adaptation is determined by the smaller nozzle chamfer cross-section.

In a shuttle bolt of simple construction, the nozzle chamfers open in a flattening at the outer circumference of the shuttle bolt.

In accordance with a compact embodiment, the components of the wagging vibration damping are configured in their own valve housing, wherein the axis of the directional control valve of the damping valve arrangement extends perpendicular to the axis of the shuttle valve.

The two valve seats of the shuttle valve are preferably each formed at a valve bushing.

The construction of the shuttle valve is chosen such that the shuttle bolt can be exchanged with comparatively little effort, so that the charging and discharging speed of the hydraulic accumulator can be adapted to different demands of work machines by exchanging of the shuttle bolt.

Instead of the afore-described shuttle valve with the two shuttle nozzles and the respectively assigned check valves, an alternative solution may also be employed to enable the filling and adaptation. Here, the larger shuttle nozzle that is active during filling is arranged in the bypass line bypassing the directional control valve and a check valve is positioned upstream thereof, said check valve allowing a pressure medium flow for filling and locking in the opposite direction. In the region between the check valve and the larger shuttle nozzle, a branch line branches off, in which the smaller shuttle nozzle is arranged and which leads to the inlet of an adaptation control valve, the outlet of which is connected with the tank. This adaptation control valve is adapted to be placed in an opening position for adaptation, so that pressure medium can flow off to the tank from the hydraulic accumulator via the two shuttle nozzles.

This variant is of particularly simple construction if the switching of the adaptation control valve is performed by the pressure at the inlet thereof.

An undesired switching of the directional control valve in its locking position can be avoided if a check valve is arranged in a filling control line that connects the hydraulic accumulator with the inlet of the pilot valve, said check valve opening in the direction to the pilot valve and locking in the opposite direction, so that, in the case of an unswitched pilot valve, a dropping of the pressure of the hydraulic accumulator does not result in a dropping of the control pressure in the control chamber of the directional control valve which is active in opening direction.

For damping the control pressure in the pilot control of the directional control valve, a direction-variable damping nozzle may be provided in a control line, and the hydraulic control arrangement may be designed with a pressure limiting valve so as to protect the hydraulic accumulator from too high pressures.

A draining of the hydraulic accumulator is possible via a preferably hand-actuated drain valve.

Figure 2:
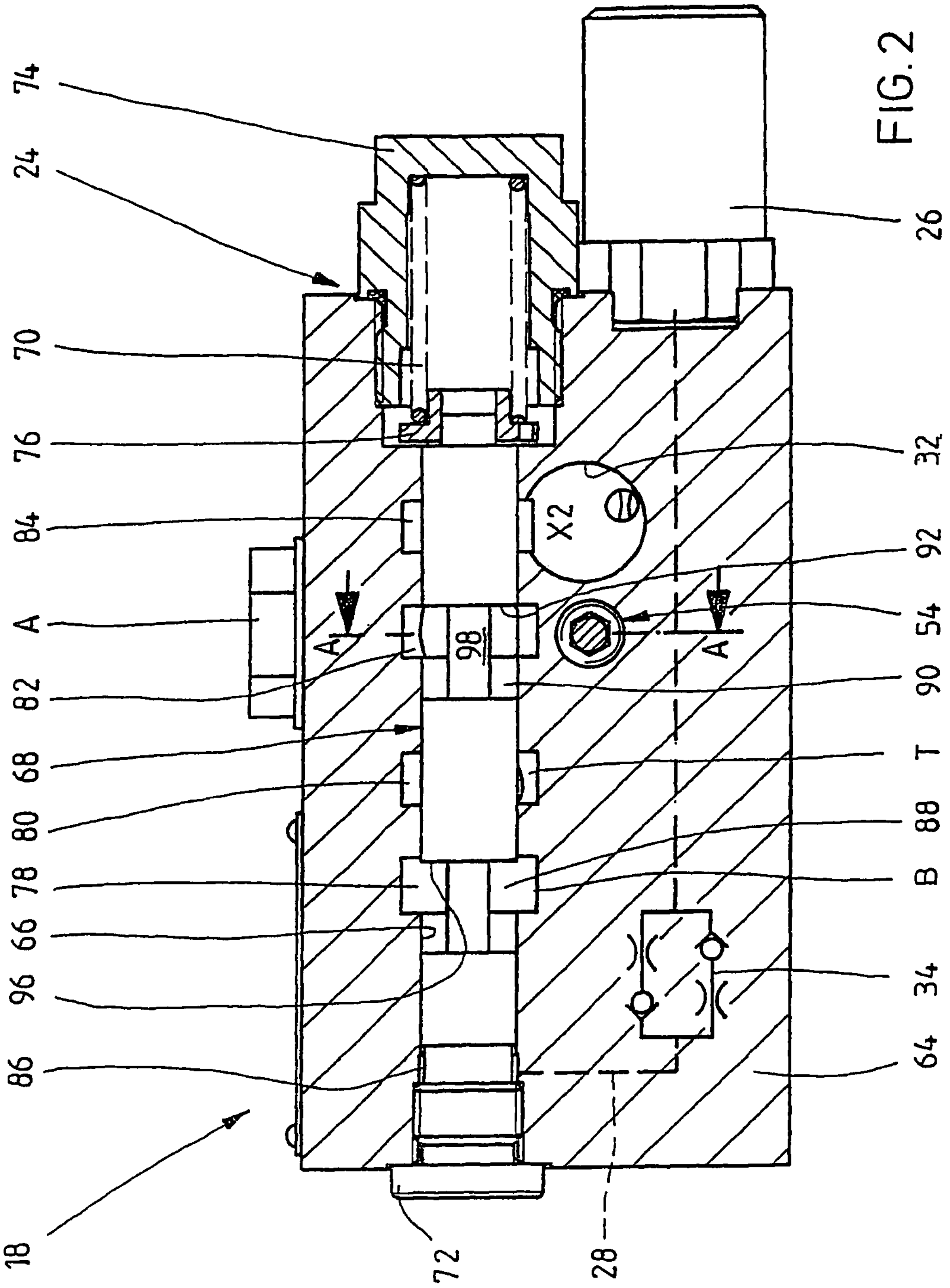
Figure 3:
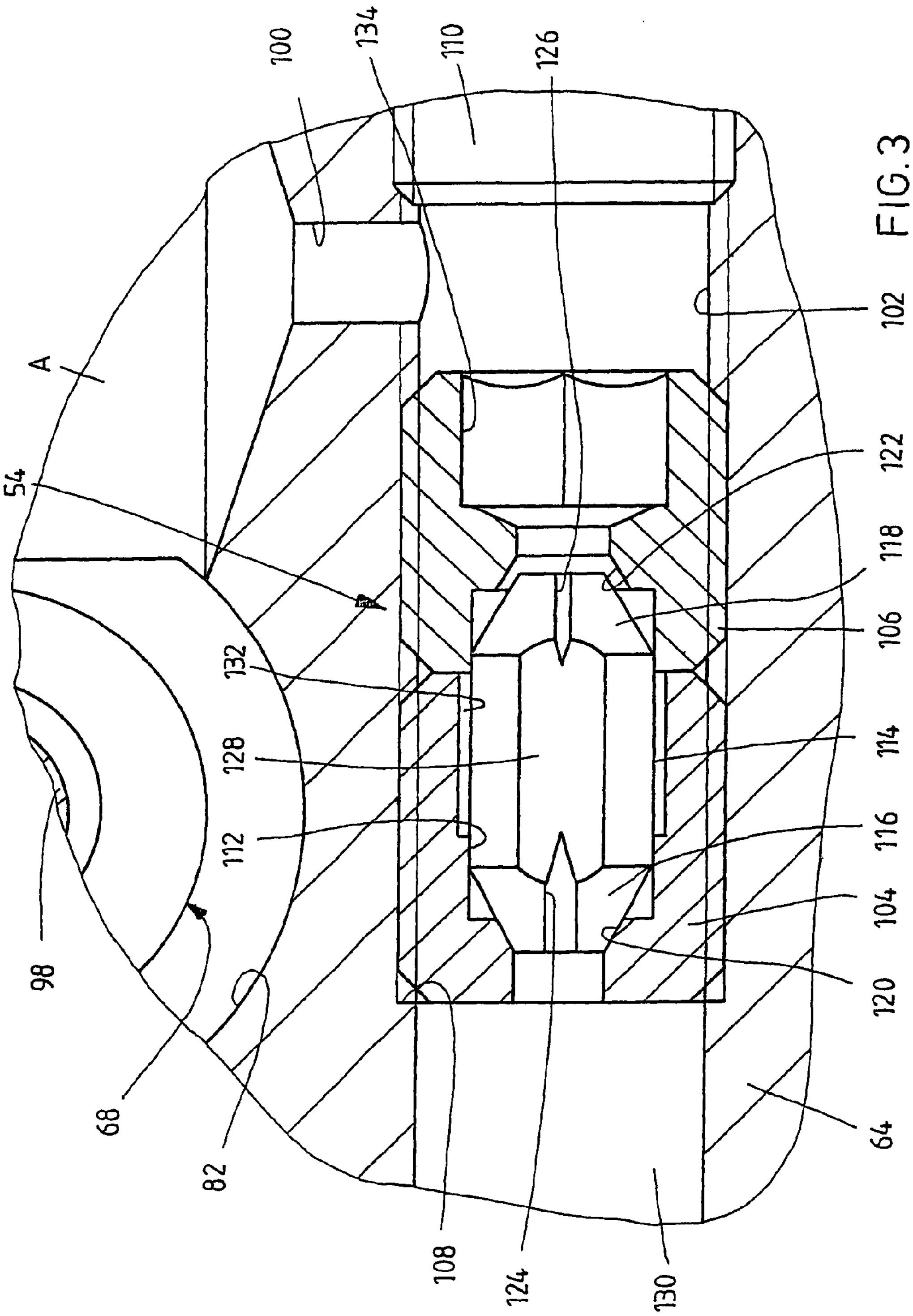
Figure 4:
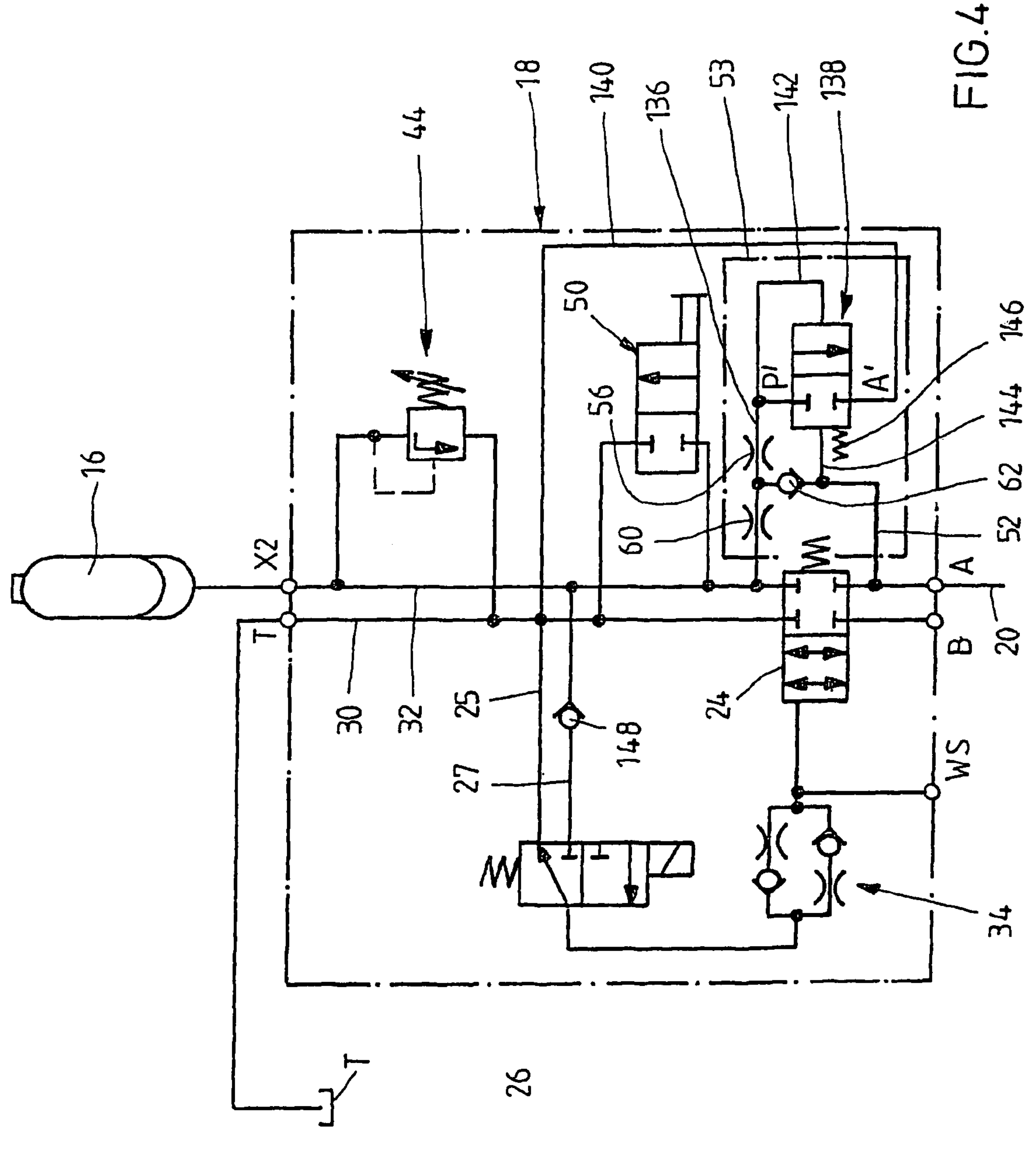

In the following, preferred embodiments of the invention will be explained in more detail by means of schematic drawings. There show:

FIG. 1 a systematic diagram of a first embodiment of an inventive hydraulic control arrangement for damping wagging vibrations;

FIG. 2 a sectional representation through a valve block of a damping valve arrangement of the control arrangement of FIG. 1;

FIG. 3 a detailed representation of a shuttle valve of the valve block of FIG. 2, and FIG. 4 a systematic diagram of a second embodiment of a control arrangement for wagging vibration damping.

FIG. 1 shows a systematic diagram of a hydraulic control arrangement for wagging vibration damping of a smaller mobile work machine, for instance a wheel loader or a fork lift. It comprises a lifting equipment for lifting loads which is actuated via two hydraulic cylinders 2, 4 that are arranged in parallel. The pressure medium supply is performed by means of a mobile control block 6 via which the two hydraulic cylinders 2, 4 are adapted to be connected with a variable displacement pump or a tank (not illustrated). Two work connections A, B of the mobile control block 6 are connected with a bottom-side cylinder chamber 12 or a ring chamber 14, respectively, of the two hydraulic cylinders 2, 4 via a supply line 8 and a drain line 10. For extending the cylinders, the pressure medium is supplied to the two cylinder chambers 12 and displaced from the two ring chambers 14 via the mobile control block 6 to a tank T. In the illustrated embodiment, the two ring chambers 14 and the cylinder chambers 12 of the hydraulic cylinders 2, 4 are directly connected with each other.

In operation of the work machine, the wagging vibration damping is performed by connecting the two cylinder chambers 12 with a hydraulic accumulator 16. It acts as a hydropneumatic spring damper element that is practically incorporated between the hydraulic cylinders 2, 4 and the mobile control block 6. The two ring chambers 14 are connected with the tank T during the wagging vibration damping. The connection with the tank T and the hydraulic accumulator 16 is performed via a damping valve arrangement 18 that is connected with its two inlet connections A, B via an accumulator line 20 and an unloading line 22 with the supply line 8 or the drain line 10, respectively. An accumulator connection X2 of the damping valve arrangement 18 is connected with the hydraulic accumulator 16 and a tank connection T is connected with the tank.

In accordance with FIG. 1, the damping valve arrangement 18 comprises a pilot-controlled 4/2 directional control valve 24 that is, by means of a spring, prestressed in its illustrated locking position in which the two work connections A, B are locked with respect to the connections X2 and T.

The controlling of the pilot-controlled directional control valve 24 is performed via an electrically actuated pilot valve 26 that connects, in its spring-prestressed basic position, a control line 28 that leads to a control chamber of the directional control valve 24 which is active in opening direction, via a tank control line 25, with a tank channel 30 that is connected with the tank connection T. If current is fed to an electromagnet of the pilot valve 26, it is placed in its switching position in which the control line 28 is, via a filling control line 27 that is connected to a connection P of the pilot valve 26, connected with an accumulator channel 32 that leads to the accumulator connection X2.

In the control line 28 there is arranged a direction-variable damping throttle 34 that is, in the embodiment illustrated, designed as a shuttle valve and comprises two throttles 36, 38 with different diameters that are connected in parallel to each other, wherein a check valve 40 that opens in the direction from the control chamber to the pilot valve 26 is assigned to the throttle 36, and a check valve 42 that enables a control oil flow to the control chamber is assigned to the throttle 38. The controlling of the pilot valve 26 is either performed by hand or as a function of a mobile control device once the work machine has exceeded a predetermined driving speed.

The damping valve arrangement 18 moreover comprises a pressure limiting valve 44 that is arranged in a connection channel 46 between the accumulator channel 82 and the tank channel 30. By this pressure limiting valve 44 the maximum pressure of the hydraulic accumulator 16 is limited.

In a drain channel 48 there is arranged a drain valve 50 that is adapted to be placed by hand from a locking position to an opening position so as to connect the hydraulic accumulator 16 with the tank channel 30. This draining of the hydraulic accumulator 16 may, for instance, be necessary for maintenance work or in the case of failure.

In accordance with FIG. 1, a bypass channel 52 branches off in the pressure medium flow path between the work connection A and the directional control valve 24. In the bypass channel 52 there is arranged a nozzle valve arrangement 53 which is, in the illustrated embodiment, designed as a shuttle valve 54, the outlet of which opens in the drain channel 48 which in turn branches off the accumulator channel 32. The shuttle valve 54 is illustrated enlarged in FIG. 1 at the left top. Accordingly, the bypass channel 52 branches in two branch lines, wherein a shuttle nozzle 56 with a comparatively small cross-section and a shuttle check valve 58 that opens in the direction of the connection A is arranged in the right branch of FIG. 1, while a shuttle nozzle 60 with a larger cross-section and a shuttle check valve 62 that opens in the direction of the hydraulic accumulator 16 is provided in the left branch. This means that in the case of a pressure medium flow from the hydraulic accumulator 16 to the work connection A (adaptation) the check valve 58 opens and the smaller shuttle nozzle 56 is flown through, whereas, in the case of a pressure medium flow from the work connection A to the hydraulic accumulator 16 (filling), the shuttle nozzle 60 with the larger cross-section is active.

For lifting the lifting equipment, i.e. during the normal working cycle, the supply line 8 is connected via the mobile control block 6 with a pump line that is not illustrated, so that the two hydraulic cylinders 2, 4 extend and the pressure medium is returned from the ring chamber via the drain line 10 and the mobile control block 6 to the tank T. The load pressure at the hydraulic cylinders is tapped via a load report line that is not illustrated, and the variable displacement pump is adjusted as a function of the highest load pressure of the loads of the work machine.

During normal operation of the work machine, the electromagnet of the control valve 26 is not supplied with current, so that the control chamber of the directional control valve 24 is relieved and the directional control valve 24 correspondingly remains in its spring-prestressed basic position. The hydraulic accumulator 16 is charged via the accumulator line 20, the bypass channel 52, the check valve 62, and the shuttle nozzle 60, and the accumulator channel 32. the maximum accumulator pressure is limited by the pressure limiting valve 44. This maximum pressure is adjusted such that the pressure limiting valve 44 does not open during a normal working cycle. If the pressure limiting valve 44 should nevertheless respond, care is taken in cooperation with the shuttle nozzle 60 that a load pressure that is active above this limiting pressure remains in front thereof.

If the load pressure at the hydraulic cylinders 2, 4 drops, the hydraulic accumulator 16 is correspondingly discharged via the check valve 58 and the smaller shuttle nozzle 56 to the lower load pressure level. The charging and discharging speed is substantially determined by the different cross-sections of the shuttle nozzles.

In operation, either the driver or the control unit of the work machine gives a signal to the pilot valve 26 and the electromagnet thereof is supplied with current, so that it is shifted to its switching position against the force of the springs, in which the control chamber of the directional control valve 24 is pressurized with the pressure in the accumulator channel 32, i.e. the pressure of the hydraulic accumulator 16. The directional control valve 24 is placed in its passage position, so that the ring chambers 14 of the hydraulic cylinders 2, 4 are connected with the tank and the cylinder chambers 12 with the hydraulic accumulator 16—the lifting equipment may swing relative to the vehicle with the hydraulic accumulator 16 serving as a spring damper element.

After the switching off of the stabilizing system, i.e. the disconnecting of the electromagnet of the pilot valve 26 from current, the latter is shifted back to its spring-prestressed basic position, and the control chamber of the directional control valve 24 is correspondingly connected with the tank T. The directional control valve is placed back to its locking position by the force of the springs, and the stabilizing system is switched off. Pressure fluctuations in the control channel 28 during these switching on and off processes of the stabilizing system are attenuated by the direction-variable damping nozzle 34.

FIG. 2 shows a sectional representation of a valve block 64 by which the damping valve arrangement 18 is formed. The valve block 64 is penetrated by a valve bore 66 in which a shifter 68 of the directional control valve 24 is guided to be shifted axially. The shifter 68 is pressurized by a spring 70 in its illustrated basic position in which it abuts at a locking screw 72 that locks up the valve bore 66. The spring 70 is supported at a cap 74 that is screwed in the valve block 64 and engages the spring cup 76 at the shifter 68.

The valve bore 66 is enlarged to four ring chambers 78, 80, 82, and 84 as well as to a control chamber 86. The latter is, on the one hand, limited by the front face of the locking screw 72 and, on the other hand, by the adjacent end section of the valve shifter 68 and is, via the control line 28 that is indicated in dashes and the variable damping throttle 34, connected with the pilot valve 26 of which only the magnet that is fixed in the valve block 64 is illustrated in FIG. 2.

The ring chamber 80 is connected with the work connection B, the ring chamber 78 with the tank connection T, the ring chamber 82 with the work connection A, and the ring chamber 84 with the accumulator connection X2 which is designed approximately perpendicular to the drawing plane in FIG. 2.

The shifter 68 comprises two control grooves 88, 90 by which the two control edges 92 and 96 are formed. By the last-mentioned control edge 96, the connection between the ring chambers 78, 80, i.e. between the work connection B and the tank connection T, is opened and closed, while the connection between the ring chambers 82, 84, i.e. between the work connection A and the accumulator connection X2, is opened and closed by the control edge 92.

The accumulator channel 32 that is connected with the accumulator connection X2 and the ring chamber 84 extends approximately perpendicular to the drawing plane in FIG. 2. Approximately parallel to the channel 32, the shuttle valve 54 is arranged in the valve block 64, the axis of which accordingly also extends perpendicular to the drawing plane in FIG. 2. The axis of the shifter 68 extends perpendicular thereto in the drawing plane according to FIG. 2. In the illustrated embodiment, the shuttle valve 54 is arranged in the region between the ring chamber 82 and the accumulator channel 32 and connected therewith via the indicated channels.

Details of the shuttle valve 54 are explained by means of FIG. 3 which illustrates a sectional representation through the shuttle valve 54 along the section line A-A indicated in FIG. 2.

This sectional representation shows the ring chamber 82, the shifter 68 and the part 98 thereof that is radially recessed by the control groove 90, as well as the work connection A and a channel 100 via which the work connection A is connected with a bore 102 of the valve block 64. In this bore 102, the shuttle valve 54 is accommodated. It comprises two valve bushings 104, 106 that are screwed in the bore 102, wherein the screwing depth is limited by a shoulder 108. In the representation of FIG. 3, the two valve bushings 104, 106 are inserted from the right, and the bore 102 is locked by a locking screw 110 during assembly. The two valve bushings 104, 106 form a valve bore 112 in which a shuttle bolt 114 is guided to be shifted axially. It comprises a valve cone 116, 118 each at its two end portions, to which a valve seat 120 and 122 in the valve bushing 104 or 106, respectively, is assigned. The distance of the two valve seats 120, 122 is chosen somewhat larger than the length of the shuttle bolt 114, so that it can always rest on one of the valve seats 120, 122 only. For easier insertion of the two valve bushings 104, 106, they are both configured with recesses 132, 134 in their right end portions for a tool to engage.

In the region of the two valve cones 116, 118, axially extending nozzle chamfers 124 or 126, respectively, are formed, wherein one or two nozzle chamfers 124 with a larger cross-section are formed at the left valve cone 116 in FIG. 3, and one single nozzle chamfer 126 with a comparatively small diameter is formed at the valve cone 118.

The nozzle chamfers 124 and 126 thus practically form the shuttle nozzles 60, 56 of the shuttle valve 54 in FIG. 1, while the valve cones 116, 118 in cooperation with the valve seats 120 or 122, respectively, form the two check valves 62, 58. At the outer circumference of the shuttle bolt 114 there are formed two flattenings 128 that are arranged diametrically to each other (see also FIG. 2), in which the nozzle chamfers 124, 126 taper off. By these flattenings 128, a pressure medium flow channel is formed along with the circumferential walls of the valve bore 112.

During filling, i.e. during the normal working cycle of the lifting equipment, the pressure medium enters the bore 102 via the work connection A and the channel 100. This pressure impacts the right front face of the shuttle bolt 114 in FIG. 3, so that it is lifted off the valve seat 122 and is placed in abutment at the valve seat 120 with the valve cone 116. The pressure medium may then flow, via the opened valve seat 122, the chamber limited by the flattening 128 and the outer circumference of the valve bore 112, and the shuttle nozzle 60 limited by the nozzle chamfers 124, to the channel section 130 and from there to the accumulator 32 channel to the hydraulic accumulator 16, so that it is charged. During the afore-described adaptation of the hydraulic accumulator 16 to the lower load pressure, the higher accumulator pressure is present in the channel section 130, so that the shuttle bolt 114 is lifted off the valve seat 120 and is shifted to the right to the valve seat 122. During adaptation, the shuttle nozzle 56 determined by the smaller nozzle chamfer 126 is then active.

A similar construction is also arranged in the control line 28 as a direction-variable damping throttle 34.

The two-part design of the valve bushing enables a very simple exchange of the shuttle bolt 114, so that the active diameters of the shuttle nozzles 56, 60 can be adapted to the demands of the vehicle.

In the afore-described embodiment, an adaptation of the pressure of the hydraulic accumulator 16 is only possible if the mobile control block 6 is correspondingly switched, so that the accumulator line 20 is connected with the tank. FIG. 4 shows a solution in which the filling and adaptation can be performed independently of the adjustment of the mobile control block 6. The basic switching corresponds to that of FIG. 1, wherein only the nozzle valve arrangement 53 is designed differently vis-à-vis the afore-described solution. The remaining hydraulic components correspond to the afore-described embodiment, so that the statements rendered with respect to FIG. 1 are referred to with respect to the concurring components so as to avoid repetitions.

In the embodiment illustrated in FIG. 4, the nozzle valve arrangement 53 also comprises two shuttle nozzles 60, 56, wherein the larger shuttle nozzle 60 determines the pressure medium flow during filling, and the shuttle nozzle 56 with the smaller diameter determines the pressure medium flow during adaptation. The shuttle nozzle 60 is, like in the afore-described embodiment, arranged in a bypass channel 52 of the damping valve arrangement 18. In the bypass channel 52, a filling check valve 62 is also provided, which allows for a pressure medium flow from the accumulator line 20 to the larger shuttle nozzle 60. In the region between the filling check valve 62 and the shuttle nozzle 20, a branch line 136 branches off, in which the smaller shuttle nozzle 56 is arranged. The branch line 136 leads to an inlet connection P' of an adaptation control valve 138, the outlet connection A' of which is connected with the tank channel 30 via a compensating line 140. The adaptation control valve 138 is, in the illustrated embodiment, a control valve that is prestressed in its illustrated locking position by means of a relatively strong spring 146. The pressure in the region between the shuttle nozzle 56 and the inlet connection P' is tapped via a control line 142 and guided to a control chamber that is active in opening direction of the adaptation control valve 138.

A control pressure active in closing direction is tapped by means of a further control line 144 from a section of the bypass channel 52 that is positioned upstream of the filling check valve 62.

The filling of the hydraulic accumulator 16 during a working cycle is performed—like in the afore-described embodiment—via the bypass channel 52, the filling check valve 62, the larger shuttle nozzle 60, and the accumulator channel 32. During filling, the adaptation control valve 138 is prestressed in its closing position by the higher pressure in the further control line 144 and the force of the spring.

The adaptation in the case of a dropping of the pressure in the cylinder chamber 12 is performed—in this embodiment independently of the adjustment of the mobile control block 6—via the adaptation control valve 138 by which the hydraulic accumulator 16 can directly be connected with the tank T, i.e. by bypassing the mobile control block 6. The actuation of the adaptation control valve is performed by a comparison of the pressure of the control line 20 that is connected to the cylinder chamber 12 with the pressure of the hydraulic accumulator 16 which is present in the accumulator channel 32. These two pressures are tapped via the two control lines 144 or 142, respectively. If the load pressure, i.e. the pressure in the cylinder chamber 12, drops, the adaptation control valve 138 is switched to its opening position by the higher accumulator pressure, so that the inlet connection P' is connected with the outlet connection A' and the accumulator is, via the accumulator channel 32, the larger shuttle nozzle 60, the smaller shuttle nozzle 56, the opened adaptation control valve 138, the compensating line 140, and the tank channel 30, connected with the tank T, so that the accumulator pressure is correspondingly adapted to the load pressure.

During this adaptation, the two shuttle nozzles 60, 56 are connected in series, wherein the pressure medium flow is substantially limited by the smaller shuttle nozzle 56, so that the adaptation processes are performed comparatively slowly, while during filling only the larger shuttle nozzle 60 is active and thus the hydraulic accumulator 16 can be quickly increased to the respective load pressure.

In FIG. 4, yet another particularity is illustrated.

It is assumed that a bucket of a wheel loader bears on the ground and the wagging vibration damping is switched on, so that the directional control valve 24 is switched to its passage position. Due to the bucket bearing on the ground, the load pressure is minimal, so that the pressure in the hydraulic accumulator 16 is correspondingly adapted by the opening of the adaptation control valve 138. The pressure in the hydraulic accumulator 16, however, remains, due to the strong spring 146, so high that the directional control valve 24 remains in its opening position. If the bucket is—for instance, on driving over a bump—lifted, additional pressure medium will correspondingly be supplied from the hydraulic accumulator 16 to the enlarging cylinder chamber 12. The pressure in the hydraulic accumulator 16 continues to drop and the directional control valve 24 could be switched back to its locking position—the quasi adjusted swimming position then would be cancelled. To avoid this undesired switching back of the directional control valve 24 to the locking position, a check valve 148 is provided in the filling control line 27 that is connected with the connection P of the pilot valve 26, which opens in the direction of the pilot valve 26 and closes in the opposite direction, so that, if the pressure in the hydraulic accumulator 16 drops, the control pressure acting on the directional control valve 24 will not drop and it thus remains in its passage position. In practice, however, it will switch independently after a certain period (e.g. 20 s) due to leakages.

The inventive switching mechanism enables the damping of wagging vibrations with a minimum effort with respect to device technology, so that the mobile work machine can be moved with higher driving speed and the handling performance is correspondingly improved. Due to the minor vibrations, the burden on the driver and the mechanical strains of the work machine are substantially lower than with machines that are not damped. Thus, the maintenance effort can be further reduced and the transport safety can be improved vis-à-vis conventional solutions.

Disclosed is a hydraulic control arrangement for damping wagging vibrations, wherein during operation a hydraulic cylinder of a lifting equipment can be connected to a hydraulic accumulator via a damping valve arrangement. The damping valve arrangement comprises a nozzle valve arrangement with two different nozzle cross-sections, the larger of which is active when filling the hydraulic accumulator and the smaller of which is active during adaptation of the hydraulic accumulator to the load pressure of the hydraulic cylinder.

LIST OF REFERENCE SIGNS

2 hydraulic cylinder
4 hydraulic cylinder
6 mobile control block
8 supply line
10 drain line
12 cylinder chamber
14 ring chamber
16 hydraulic accumulator
18 damping valve arrangement
20 accumulator line
22 unloading line
24 directional control valve
25 tank control line
26 pilot valve
27 filling control line
28 control line
30 tank channel
32 accumulator channel
34 damping throttle
36 throttle
38 throttle
40 check valve
42 check valve
44 pressure limiting valve
46 connecting channel
48 drain channel
50 drain valve
52 bypass channel
53 nozzle valve arrangement
54 shuttle valve
56 shuttle nozzle
58 check valve
60 shuttle nozzle
62 check valve
64 valve block
66 valve bore
68 shifter
70 spring
72 locking screw
74 locking cap
76 spring cup
78 ring chamber
80 ring chamber
82 ring chamber
84 ring chamber
86 control chamber
88 control groove
90 control groove
92 control edge
96 control edge
98 part
100 channel
102 bore
104 valve bushing
106 valve bushing
108 shoulder
110 locking screw
112 valve bore
114 shuttle bolt
116 valve cone
118 valve cone
120 valve seat
122 valve seat
124 nozzle chamfers
126 nozzle chamfers
128 flattening
130 channel section
132 recess
134 recess
136 branch line
138 adaptation control valve
140 compensating line
142 control line
144 further control line
146 spring
148 check valve

The invention claimed is:

1. A hydraulic control arrangement for damping wagging vibrations of a mobile work machine, comprising:
- a hydraulic cylinder for actuating a work tool;
- a damping valve arrangement via which a first pressure chamber of the hydraulic cylinder which is active in support direction is adapted to be connected with a hydraulic accumulator for wagging vibration damping; and a pressure chamber of the hydraulic cylinder which is active in lowering direction is adapted to be connected with a tank or low pressure, and via which the hydraulic accumulator is, during a working cycle of the hydraulic cylinder, adapted to be connected with an accumulator line for filling, and with the tank or low pressure for adapting the accumulator pressure to the load pressure of the hydraulic cylinder, wherein said damping valve arrangement comprises a nozzle valve arrangement with two different shuttle nozzles, the larger shuttle nozzle of which is active during filling, and the smaller shuttle nozzle of which is active during adaptation, wherein said damping valve arrangement comprises:

a pilot-controlled directional control valve which locks, in a basic position, a connection between said first pressure chamber and said hydraulic accumulator and between said second pressure chamber and said tank, and which opens these connections in a switching position, wherein the pilot control is performed with an electrically actuated pilot valve that impacts, in one position, a control face that is active in opening direction of said directional control valve with the tank or low pressure, and in a second switching position with the accumulator pressure.

2. The hydraulic control arrangement according to claim 1, wherein said nozzle valve arrangement is arranged in a bypass line to said directional control valve.

3. The hydraulic control arrangement according to claim 1, wherein the nozzle valve arrangement is a shuttle valve and wherein a check valve is assigned to each shuttle nozzle.

4. The hydraulic control arrangement according to claim 3, wherein said shuttle valve comprises:

a shuttle bolt that is guided to be moved in a valve bore between two valve seats; and a valve cone each at the front side, at the outer circumference of which at least one nozzle chamfer is formed, wherein the active nozzle chamfer cross-section is larger at one valve cone than at the other valve cone.

5. The hydraulic control arrangement according to claim 4, wherein said nozzle chamfers open in at least one flattening extending axially parallel at the outer circumference of said shuttle bolt.

6. The hydraulic control arrangement according to claim 4, wherein the shuttle axis is positioned perpendicular to the axis of said directional control valve.

7. The hydraulic control arrangement according to claim 4, wherein said valve seats each are respectively formed at a valve bushing.

8. The hydraulic control arrangement according to claim 4, wherein said shuttle bolt is arranged to be changeable.

9. The hydraulic control arrangement according to claim 2, wherein said larger shuttle nozzle is arranged in said bypass line in which a check valve opening in the direction of filling is provided, and wherein a branch line branches off a bypass line section between said check valve and said larger shuttle nozzle, said branch line being guided to an inlet connection of an adaptation control valve, an outlet connection of which is connected with said tank line via a compensating line, and which is adapted to be shifted from a locking position to an opening position for adaptation.

10. The hydraulic control arrangement according to claim 9, wherein said adaptation control valve is a control valve whose valve body is impacted in closing direction via a spring and by a control pressure corresponding to the load pressure, and in opening direction by a pressure corresponding to the accumulator pressure.

11. The hydraulic control arrangement according to claim 2, wherein a check valve locking in the direction to said hydraulic accumulator is arranged in a filling control line connecting an inlet connection of said pilot valve with said hydraulic accumulator.

12. The hydraulic control arrangement according to claim 1, wherein a direction-variable damping nozzle is provided in a control line between said pilot valve and a control chamber comprising the control face.

13. The hydraulic control arrangement according to claim 1, comprising a pressure limiting valve for limiting the maximum accumulator pressure, said pressure limiting valve being positioned downstream of said nozzle valve arrangement when viewed in filling direction of said hydraulic accumulator.

14. The hydraulic control arrangement according to claim 1, comprising a hand-actuated drain valve for connecting said hydraulic accumulator with said tank.

* * * * *